(12) United States Patent
Chen et al.

(10) Patent No.: US 11,218,987 B2
(45) Date of Patent: Jan. 4, 2022

(54) METHOD AND APPARATUS FOR DETERMINING POSITION OF TERMINAL, AND STORAGE MEDIUM

(71) Applicant: ZTE CORPORATION, Shenzhen (CN)

(72) Inventors: Xianming Chen, Shenzhen (CN); Bo Dai, Shenzhen (CN); Weiwei Yang, Shenzhen (CN); Kun Liu, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 512 days.

(21) Appl. No.: 16/305,491

(22) PCT Filed: Jun. 2, 2017

(86) PCT No.: PCT/CN2017/087094
§ 371 (c)(1),
(2) Date: Nov. 29, 2018

(87) PCT Pub. No.: WO2017/206959
PCT Pub. Date: Dec. 7, 2017

(65) Prior Publication Data
US 2021/0235412 A1    Jul. 29, 2021

(30) Foreign Application Priority Data
Jun. 3, 2016    (CN) .......................... 201610392847.8

(51) Int. Cl.
*H04W 72/04* (2009.01)
*H04W 68/00* (2009.01)
(Continued)

(52) U.S. Cl.
CPC ......... *H04W 68/005* (2013.01); *H04L 1/0061* (2013.01); *H04W 24/08* (2013.01);
(Continued)

(58) Field of Classification Search
CPC ............... H04W 68/005; H04W 72/12; H04W 72/0453; H04W 72/0466; H04W 72/042;
(Continued)

(56) References Cited

U.S. PATENT DOCUMENTS 9,572,063 B2 *  2/2017  Etemad ................. H04L 45/306
9,648,657 B2    5/2017  Pelletier et al.
(Continued)

FOREIGN PATENT DOCUMENTS

CN    1780460 A      5/2006
CN    101207840 A    6/2008
(Continued)

OTHER PUBLICATIONS

Ericsson., "R1-165355, NB-IoT-NPDCCH Ordered PRACH", 3GPP TSG RAN WG1 #85, May 27, 2016 (May 27, 2016), chapters 1-3.
(Continued)

*Primary Examiner* — Wei Zhao
(74) *Attorney, Agent, or Firm* — Li & Cai Intellectual Property (USA) Office

(57) ABSTRACT

The present invention provides a method and an apparatus for determining a position of a terminal, and a storage medium. The method comprises: sending first DCI or a paging message to a terminal, wherein the first DCI or the paging message is used for triggering the terminal to send a signal and the transmission of the first DCI is started at a paging moment of the terminal; and determining a position of the terminal according to the signal sent by the terminal. The technical solution solves the problem in the related art that a position of a terminal is determined only depending on (Continued)

Send a paging message or first downlink control information (DCI) to a terminal, the first DCI or the paging message being used to trigger the terminal to send a signal, and transmission of the first DCI being started from a paging opportunity (PO) of the terminal — S102

Determine a position of the terminal according to the signal from the terminal — S104 an uplink signal sent by the terminal device in a connected state, and can easily determine the position of the terminal, thereby avoiding unnecessary power consumption of the terminal and helping saving power of a terminal device.

16 Claims, 12 Drawing Sheets

(51) Int. Cl.
    *H04W 76/11*    (2018.01)
    *H04L 1/00*    (2006.01)
    *H04W 24/08*    (2009.01)

(52) U.S. Cl.
    CPC ..... *H04W 72/042* (2013.01); *H04W 72/0446* (2013.01); *H04W 72/0453* (2013.01); *H04W 72/0466* (2013.01); *H04W 76/11* (2018.02)

(58) Field of Classification Search
    CPC .. H04W 72/0446; H04W 24/08; H04L 1/0061
    See application file for complete search history.

(56) References Cited

U.S. PATENT DOCUMENTS

| | | |
|---|---|---|
| 2012/0281566 A1 | 11/2012 | Pelletier |
| 2015/0358881 A1 | 12/2015 | Cui et al. |
| 2016/0353339 A1 | 12/2016 | Cui et al. |
| 2018/0205526 A1* | 7/2018 | Kim .......................... H04L 5/00 |
| 2018/0323917 A1* | 11/2018 | Um ........................ H04L 5/0053 |

FOREIGN PATENT DOCUMENTS

| | | |
|---|---|---|
| CN | 101247629 A | 8/2008 |
| CN | 101325782 A | 12/2008 |
| CN | 101511053 A | 8/2009 |
| CN | 101518142 A | 8/2009 |
| CN | 101772160 A | 7/2010 |
| CN | 101998628 A | 3/2011 |
| CN | 102006547 A | 4/2011 |
| CN | 102036375 A | 4/2011 |
| CN | 102036381 A | 4/2011 |
| CN | 103460788 A | 12/2013 |
| CN | 105142161 A | 12/2015 |
| CN | 105227492 A | 1/2016 |

OTHER PUBLICATIONS

Ericsson., "R1-160260, NB-IoT-NB-PDCCH Design", 3GPP TSG-RAN1-RAN1 #84, Feb. 19, 2016 (Feb. 19, 2016), chapter2.
Intel Corporation., "R2-160448. Considerations on Positioning Support for NB-IOT", 3GPP TSG-RAN WG2 NB-IOT, Jan. 21, 2016 (Jan. 21, 2016), the whole document.
Catt., "R2-161148, Consideration on Positioning in NB IoT", 3GPP TSG RAN WG2 Meeting #93, Feb. 19, 2016 (Feb. 19, 2016), the whole document.
International Search Report in the international application No. PCT/CN2017/087094 and English translation thereof, dated Aug. 24, 2017.
First Office Action dated May 25, 2020 for application No. CN201610392847.8.
Ericsson, NB-IoT-NB-PDCCH design, St. Julian, Malta, Feb. 15-19, 2016.
Ericsson, NB-IoT-NPDCCH ordered PRACH, Nanjing, P.R. China, May 23-27, 2016.

* cited by examiner

METHOD AND APPARATUS FOR DETERMINING POSITION OF TERMINAL, AND STORAGE MEDIUM

TECHNICAL FIELD

The disclosure relates to the field of wireless communication, and particularly, to a method and an apparatus for determining a position of a terminal, and a storage medium.

BACKGROUND

For satisfying a requirement of cellular Internet of things (C-IoT), a new access system named narrow band-cellular Internet of things (NB-IoT) is proposed by the 3rd generation partnership project (3GPP). The NB-IoT system focuses on low-complexity and low-throughput radio frequency access technologies, and research objectives mainly include improvement of indoor coverage, support to massive low-throughput user equipment, low delay sensitivity, ultralow equipment cost, low equipment power loss and a network architecture. Both of uplink and downlink transmitted bandwidths of the NB-IoT system are 180 kHz which is the same as a bandwidth of a physical resource block (PRB) of a long term evolution (LTE) system, which is favorable for reuse of a related design of the existing LTE system in the NB-IoT system. In addition, the NB-IoT system also supports three different operating modes: 1) in a stand-alone operation, for example, a frequency spectrum presently used for a global system for mobile communications (GSM) EDGE radio access network (GERAN) is utilized instead of one or more GSM carriers; 2) in a guard band operation, for example, a resource block which is not used within a guard band range of an LTE carrier is utilized; and 3) in an in-band operation, for example, a resource block in a normal LTE carrier range is utilized.

In many NB-IoT applications (for example, fixed asset tracking), it is important to position and track a terminal. In a present NB-IoT system, it is impossible for a base station to determine a position of a terminal device based on an NB-IoT uplink signal from the terminal in an idle state, because the base station cannot know which terminal device sends the NB-IoT uplink signal in advance. The position of the terminal device may be determined only depending on an NB-IoT uplink signal from the terminal device in a connected state. In such case, when the terminal device is in the idle state, for determining the position of the terminal device, the terminal device is required to be switched from the idle state to the connected state in advance, which results in unnecessary power loss of the terminal device.

For the problem in the related art that a position of a terminal may be determined only depending on an uplink signal from the terminal device in a connected state, no effective solution has been proposed.

SUMMARY

Embodiments of the disclosure provide a method and a device for determining a position of a terminal and a storage medium, so as to solve at least the problem in the related art that the position of the terminal is determined only depending on an uplink signal from the terminal device in a connected state.

According to an embodiment of the disclosure, a method for determining a position of a terminal is provided, which includes the following operations.

First downlink control information (DCI) or a paging message is sent to the terminal, the first DCI or the paging message being used to trigger the terminal to send a signal, and transmission of the first DCI being started from a paging opportunity (PO) of the terminal; and a position of the terminal is determined according to the signal from the terminal.

Optionally, the method may further include that: cyclic redundancy check (CRC) bits of the first DCI are scrambled through one of: a paging-radio network temporal identifier (P-RNTI), a terminal device identifier or low bits of the terminal device identifier.

Optionally, the first DCI may be further used to indicate at least one of: signal information corresponding to the signal; or whether the terminal, after sending the signal, is required to monitor response information returned by a network-side device.

Optionally, the paging message may be further used to indicate at least one of:

the terminal device identifier; the terminal device identifier and the signal information corresponding to the signal; or whether the terminal, after sending the signal, is required to monitor the response information returned by the network-side device.

Optionally, the signal information may include at least one of: a coverage level (CL), a frequency-domain position, a time-domain position, the number of transmissions performed according to the CL, an interval between two adjacent transmissions, sequence information or power information.

Optionally, the signal may include a preamble.

Optionally, when the signal is the preamble, a transmission opportunity for transmission of the preamble may be the same as a transmission opportunity for transmission of a random access preamble, or the transmission opportunity for transmission of the preamble may be indicated through specified signaling.

Optionally, the specified signaling may be used to indicate at least one of the following parameters: a period, a time-domain offset, a frequency-domain subcarrier offset or a subcarrier number. The parameters are used to determine the transmission opportunity for transmission of the preamble.

Optionally, an available transmission opportunity for the signal may satisfy the following conditions: the available transmission opportunity is after the first DCI or the paging message; and a time difference between a start moment of the available transmission opportunity and an ending moment of the first DCI or the paging message exceeds a predetermined value.

According to another embodiment of the disclosure, a method for determining a position of a terminal is also provided, which includes the following operations.

Second DCI used to trigger the terminal to send a signal is sent to the terminal, the terminal being in a connected state, CRC bits of the second DCI being scrambled through a terminal device identifier, and transmission of the second DCI occupying a candidate set in a search space of a terminal-specific downlink control channel.

A position of the terminal is determined according to the signal from the terminal.

Optionally, the second DCI may be further used to indicate at least one of: signal information corresponding to the signal; or whether the terminal, after sending the signal, is required to monitor response information returned by a network-side device.

Optionally, the signal information may include at least one of: a CL, a frequency-domain position, a time-domain position, the number of transmissions performed according to the CL, an interval between two adjacent transmissions, sequence information or power information.

Optionally, the terminal device identifier may include a cell-radio network temporary identifier (C-RNTI).

Optionally, the signal may include a preamble.

According to another aspect of the disclosure, a method for determining a position of a terminal is also provided, which includes the following operations.

The terminal receives a paging message or first DCI from a network-side device, the first DCI or the paging message being used to trigger the terminal to send a signal, and transmission of the first DCI being started from a PO of the terminal.

The terminal sends the signal to the network-side device.

Optionally, the method may further include the following operation. CRC bits of the first DCI are scrambled through one of: a P-RNTI, a terminal device identifier or low bits of the terminal device identifier.

Optionally, when the CRC bits of the first DCI are scrambled through the low bits of the terminal device identifier, high bits of the terminal device identifier may be determined through the first DCI; and when the CRC bits of the first DCI are scrambled through the P-RNTI, the terminal device identifier may be determined through the first DCI.

Optionally, the first DCI may be further used to determine at least one of: signal information corresponding to the signal; or whether response information returned by the network-side device is required to be monitored after the signal is sent.

Optionally, the paging message may be further used to determine at least one of: the terminal device identifier; the terminal device identifier and the signal information corresponding to the signal; or whether the response information returned by the network-side device is required to be monitored after the signal is sent.

Optionally, the response information returned by the network-side device may not be monitored after the signal is sent.

Optionally, the signal information may include at least one of: a CL, a frequency-domain position, a time-domain position, the number of transmissions performed according to the CL, an interval between two adjacent transmissions, sequence information or power information.

Optionally, the terminal may send the signal to the network-side device according to the signal information.

Optionally, the signal may include a preamble.

Optionally, when the signal is the preamble, a transmission opportunity for transmission of the preamble may be the same as a transmission opportunity for transmission of a random access preamble, or the transmission opportunity for transmission of the preamble may be determined according to specified signaling.

Optionally, the specified signaling may be used to indicate at least one of the following parameters: a period, a time-domain offset, a frequency-domain subcarrier offset or a subcarrier number, the parameters being used to determine the transmission opportunity for transmission of the preamble.

Optionally, an available transmission opportunity for the signal may satisfy the following conditions: the available transmission opportunity is after the first DCI or the paging message; and a time difference between a start moment of the available transmission opportunity and an ending moment of the first DCI or the paging message exceeds a predetermined value.

According to another aspect of the disclosure, a method for determining a position of a terminal is also provided, which includes the following operations.

The terminal receives second DCI from a network-side device.

The terminal is in a connected state, the second DCI is used to trigger the terminal to send a signal, CRC bits of the second DCI are scrambled through a terminal device identifier, and transmission of the second DCI may occupy a candidate set in a search space of a terminal-specific downlink control channel.

The terminal sends the signal to the network-side device.

Optionally, the second DCI may be further used to indicate at least one of: signal information corresponding to the signal; or whether the terminal, after sending the signal, is required to monitor response information returned by a network-side device.

Optionally, the response information returned by the network-side device may not be monitored after the signal is sent.

Optionally, the signal information may include at least one of: a CL, a frequency-domain position, a time-domain position, the number of transmissions performed according to the CL, an interval between two adjacent transmissions, sequence information or power information.

Optionally, the terminal device identifier may include a C-RNTI.

Optionally, the signal may include a preamble.

According to another aspect of the disclosure, a device for determining a position of a terminal is also provided, which is applied to a network-side device and includes a first sending module and a first determination module.

The first sending module is configured to send a paging message or first DCI to the terminal, the first DCI or the paging message being used to trigger the terminal to send a signal, and transmission of the first DCI being started from a PO of the terminal.

The first determination module may be configured to determine a position of the terminal according to the signal from the terminal.

Optionally, the signal may include a preamble.

Optionally, when the signal is the preamble, a transmission opportunity for transmission of the preamble may be the same as a transmission opportunity for transmission of a random access preamble, or the transmission opportunity for transmission of the preamble may be indicated through specified signaling.

Optionally, the specified signaling may be used to indicate at least one of the following parameters: a period, a time-domain offset, a frequency-domain subcarrier offset or a subcarrier number, the parameters being used to determine the transmission opportunity for transmission of the preamble.

According to another embodiment of the disclosure, a device for determining a position of a terminal is also provided, which is applied to a network-side device and includes a second sending module and a second determination module.

The second sending module is configured to send second DCI used to trigger the terminal to send a signal to the terminal, the terminal being in a connected state, CRC bits of the second DCI being scrambled through a terminal device identifier, and transmission of the second DCI occupying a candidate set in a search space of a terminal-specific downlink control channel.

The second determination module is configured to determine a position of the terminal according to the signal from the terminal.

Optionally, the terminal device identifier may include a C-RNTI.

Optionally, the signal may include a preamble.

According to another aspect of the disclosure, a device for determining a position of a terminal is also provided, which is applied to the terminal and includes a first receiving module and a third sending module.

The first receiving module is configured to receive a paging message or first DCI from a network-side device, the first DCI or the paging message being used to trigger the terminal to send a signal, and transmission of the first DCI being started from a PO of the terminal.

The third sending module is configured to send the signal to the network-side device.

Optionally, the signal may include a preamble.

Optionally, when the signal is the preamble, a transmission opportunity for transmission of the preamble may be the same as a transmission opportunity for transmission of a random access preamble, or the transmission opportunity for transmission of the preamble may be determined according to specified signaling.

Optionally, the specified signaling may be used to indicate at least one of the following parameters: a period, a time-domain offset, a frequency-domain subcarrier offset or a subcarrier number, the parameters being used to determine the transmission opportunity for transmission of the preamble.

Optionally, an available transmission opportunity for the signal may satisfy the following conditions: the available transmission opportunity is after the first DCI or the paging message; and a time difference between a start moment of the available transmission opportunity and an ending moment of the first DCI or the paging message exceeds a predetermined value.

According to another aspect of the disclosure, a device for determining a position of a terminal is also provided, which is applied to the terminal and includes a second receiving module and a fourth sending module.

The second receiving module is configured to receive second DCI from a network-side device, the terminal being in a connected state, the second DCI being used to trigger the terminal to send a signal, CRC bits of the second DCI being scrambled through a terminal device identifier, and transmission of the second DCI occupying a candidate set in a search space of a terminal-specific downlink control channel.

The fourth sending module is configured to send the signal to the network-side device.

Optionally, the response information returned by the network-side device may not be monitored after the signal is sent.

Optionally, the terminal device identifier may include a C-RNTI.

The embodiments of the disclosure also provide a storage medium. The computer storage medium may store an executable instruction configured to execute the method for determining a position of a terminal in the abovementioned embodiments.

In the embodiments of the disclosure, the first DCI or paging message capable of triggering the terminal to send the signal is sent to the terminal, transmission of the first DCI being started from the PO of the terminal, and the position of the terminal is further determined according to the signal from the terminal, thereby solving the problem in the related art that the position of the terminal is determined only depending on an uplink signal from the terminal device in the connected state, thus the position of the terminal can be conveniently confirmed, unnecessary power loss can be avoided and power saving of the terminal device can be facilitated.

BRIEF DESCRIPTION OF DRAWINGS

The drawings described herein are intended to provide further understanding of the disclosure and constitute a part of the application. Schematic embodiments of the disclosure and descriptions thereof are intended to explain the disclosure and not intended to unduly limit the disclosure. In the drawings.

DETAILED DESCRIPTION

The disclosure will be described in detail below with reference to the drawings and in combination with the embodiments. It is to be noted that, in the case of no conflict, the features in the embodiments and the embodiments in the disclosure may be arbitrarily combined with each other.

It is to be noted that terms "first", "second" and the like in the specification, claims and the above drawings of the disclosure are adopted to distinguish similar objects and not necessarily to describe a specific order or sequence.

The operations illustrated in the flowcharts of the drawings may be executed in a computer system, for example, a group of computer-executable instructions. Moreover, although logic orders are illustrated in the flowcharts, the illustrated or described operations may be executed in orders different from the orders herein in some circumstances.

First Embodiment

Figure 1:
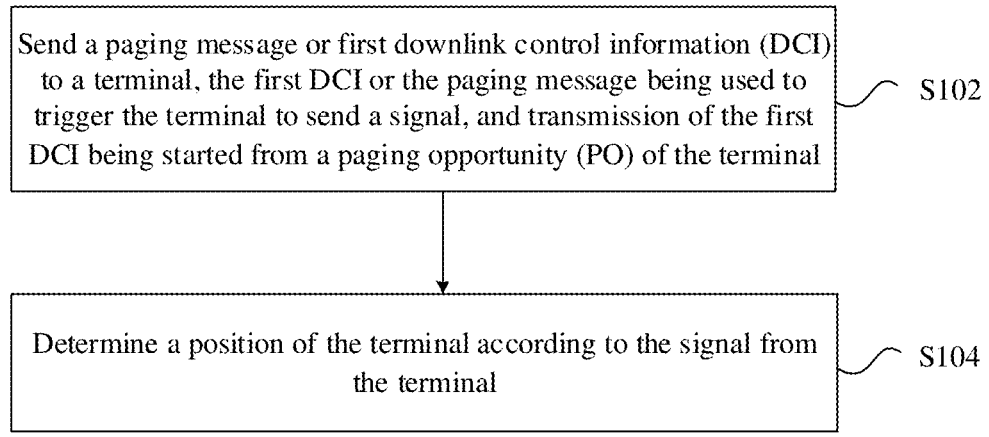
FIG. 1 is a first flowchart of a method for determining a position of a terminal according to an embodiment of the disclosure.

The embodiment of the disclosure provides a method for determining a position of a terminal. FIG. 1 is a first flowchart of a method for determining a position of a terminal according to an embodiment of the disclosure. As illustrated in FIG. 1, the method includes the following operations.

In S102, a paging message or first DCI is sent to a terminal, the first DCI or the paging message being used to trigger the terminal to send a signal, and transmission of the first DCI being started from a PO of the terminal.

In S104, a position of the terminal is determined according to the signal from the terminal.

Through the operations, the first DCI or paging message capable of triggering the terminal to send the signal is sent to the terminal, transmission of the first DCI being started from the PO of the terminal, and the position of the terminal is further determined according to the signal from the terminal, thereby solving the problem in the related art that the position of the terminal is determined only depending on an uplink signal from the terminal device in a connected state, thus the position of the terminal can be conveniently confirmed, unnecessary power loss can be avoided and power saving of the terminal device can be facilitated.

In the embodiment of the disclosure, CRC bits of the first DCI are scrambled through one of: a P-RNTI, a terminal device identifier or low bits of the terminal device identifier. When the CRC bits of the first DCI are scrambled through the low bits of the terminal device identifier, high bits of the terminal device identifier are indicated through the first DCI. When the CRC bits of the first DCI are scrambled through the P-RNTI, the terminal device identifier is indicated through the first DCI.

Optionally, the first DCI may be further used to indicate at least one of: signal information corresponding to the signal; or whether the terminal, after sending the signal, is required to monitor response information returned by a network-side device. The paging message may be further used to indicate at least one of: the terminal device identifier; the terminal device identifier and the signal information corresponding to the signal; or whether the terminal, after sending the signal, is required to monitor the response information returned by the network-side device.

Herein, the signal information includes at least one of: a CL, a frequency-domain position, a time-domain position, the number of transmissions performed according to the CL, an interval between two adjacent transmissions, sequence information or power information.

Optionally, an available transmission opportunity for the signal may satisfy the following conditions: the available transmission opportunity is after the first DCI or the paging message; and a time difference between a start moment of the available transmission opportunity and an ending moment of the first DCI or the paging message exceeds a predetermined value.

In a practical application, the above signal may be a preamble. There are no limits made thereto in the embodiment of the disclosure.

Optionally, when the signal is the preamble, a transmission opportunity for transmission of the preamble may be the same as a transmission opportunity for transmission of a random access preamble, or the transmission opportunity for transmission of the preamble may be indicated through specified signaling.

Optionally, the specified signaling may be used to indicate at least one of the following parameters: a period, a time-domain offset, a frequency-domain subcarrier offset or a subcarrier number, the indicated parameters being used to determine the transmission opportunity for transmission of the preamble.

Descriptions are mainly made in the above embodiment from the perspective of the network-side device, for better understanding the above technical solutions, descriptions will be made below in combination with a second embodiment from a terminal side.

Second Embodiment

Figure 2:
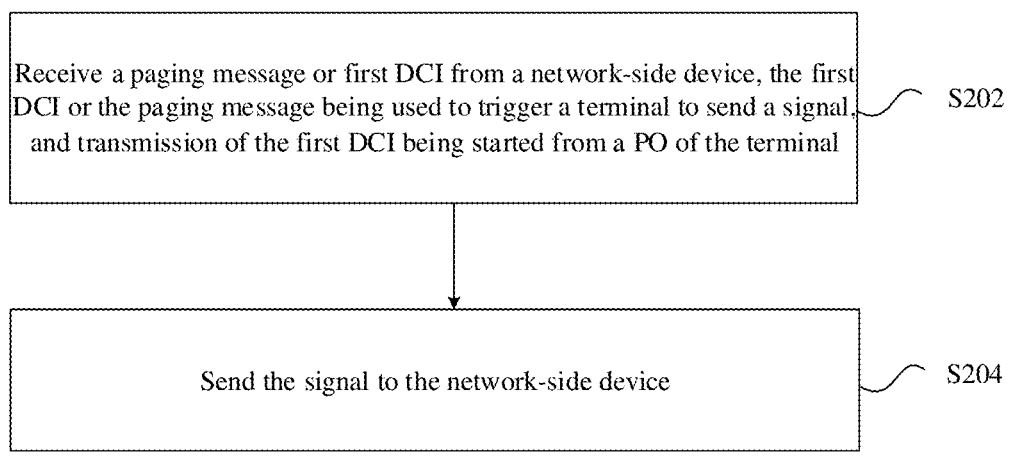
FIG. 2 is a second flowchart of a method for determining a position of a terminal according to an embodiment of the disclosure.

The embodiment of the disclosure provides a method for determining a position of a terminal. FIG. 2 is a second flowchart of a method for determining a position of a terminal according to an embodiment of the disclosure. As illustrated in FIG. 2, the method includes the following operations.

In S202, a paging message or first DCI from a network-side device is received, the first DCI or the paging message being used to trigger a terminal to send a signal, and transmission of the first DCI being started from a PO of the terminal.

In S204, the signal is sent to the network-side device.

Through the above operations, the first DCI or the paging message capable of triggering the terminal to send the signal is received from the network-side device. Transmission of the first DCI is started from the PO of the terminal, and the signal is further sent to the network-side device. By using the technical solution, the problem in the related art that the position of the terminal is determined only depending on an uplink signal from the terminal device in a connected state can be solved, the position of the terminal can be conveniently confirmed, unnecessary power loss of the terminal can be avoided and power saving of the terminal device can be facilitated.

In the embodiment of the disclosure, CRC bits of the first DCI are scrambled through one of: a P-RNTI, a terminal device identifier or low bits of the terminal device identifier.

Optionally, when the CRC bits of the first DCI are scrambled through the low bits of the terminal device identifier, high bits of the terminal device identifier may be determined through the first DCI. When the CRC bits of the first DCI are scrambled through the P-RNTI, the terminal device identifier may be determined through the first DCI.

Optionally, the first DCI may be further used to determine at least one of: signal information corresponding to the signal; or whether response information returned by the network-side device is required to be monitored after the signal is sent. The paging message may be further used to determine at least one of: the terminal device identifier; the terminal device identifier and the signal information corresponding to the signal; or whether the response information returned by the network-side device is required to be monitored after the signal is sent.

Optionally, a response message returned by the network-side device may not be always monitored by default after the signal is sent.

Optionally, the signal information may include at least one of: a CL, a frequency-domain position, a time-domain position, the number of transmissions performed according to the CL, an interval between two adjacent transmissions, sequence information or power information.

Optionally, an available transmission opportunity for the signal may satisfy the following conditions: the available transmission opportunity is after the first DCI or the paging message; and a time difference between a start moment of the available transmission opportunity and an ending moment of the first DCI or the paging message exceeds a predetermined value.

Optionally, the terminal may send the signal to the network-side device according to the signal information.

Optionally, the signal may include a preamble.

When the signal is the preamble, a transmission opportunity for transmission of the preamble is the same as a transmission opportunity for transmission of a random access preamble, or the transmission opportunity for transmission of the preamble is determined according to specified signaling. The specified signaling is used to indicate at least one of the following parameters: a period, a time-domain offset, a frequency-domain subcarrier offset or a subcarrier number, the indicated parameters being used to determine the transmission opportunity for transmission of the preamble.

The terminal involved in the above technical solution may be in an idle state and may also be in a connected state. For the terminal is in the connected state, such as the technical solutions shown in the first and second embodiments, the network-side device is limited to start triggering the terminal to send the signal from the PO, which results in an unnecessary location delay of the terminal in the connected state. In addition, up to now, there is yet no good solution to a specific manner of determining a position of a terminal for the terminal in the connected state. For solving the technical problem, the following technical solutions are also provided in a third and fourth embodiments.

Third Embodiment

Figure 3:
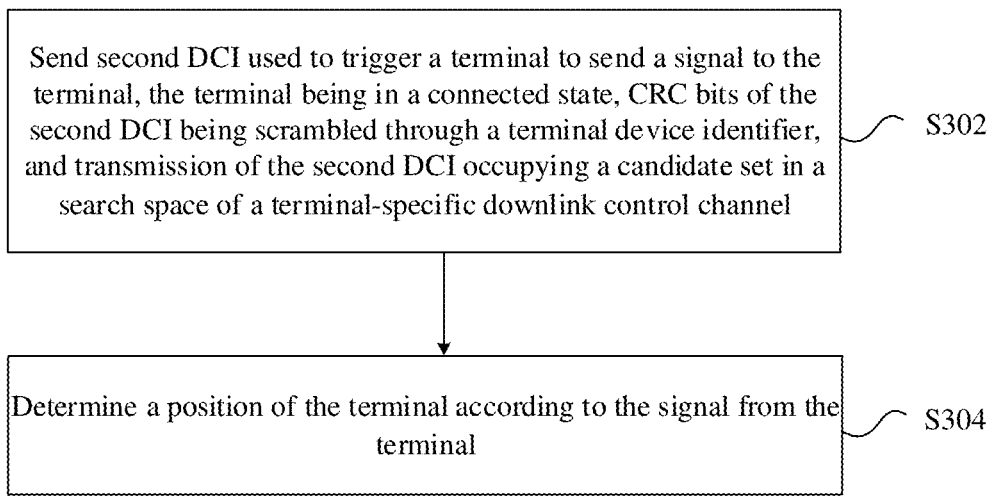
FIG. 3 is a third flowchart of a method for determining a position of a terminal according to an embodiment of the disclosure.

The embodiment of the disclosure provides a method for determining a position of a terminal. FIG. 3 is a third flowchart of a method for determining a position of a terminal according to an embodiment of the disclosure. As illustrated in FIG. 3, the method includes the following operations.

In S302, second DCI used to trigger a terminal to send a signal is sent to the terminal, the terminal being in a connected state, CRC bits of the second DCI being scrambled through a terminal device identifier, and transmission of the second DCI occupying a candidate set in a search space of a terminal-specific downlink control channel.

In S304, a position of the terminal is determined according to the signal from the terminal.

Through the above operations, the second DCI used to trigger the terminal to send the signal is sent to the terminal, the terminal being in the connected state, the CRC bits of the second DCI being scrambled through the terminal device identifier and the terminal device identifier being a C-RNTI, and the position of the terminal is further determined according to the signal from the terminal. Accordingly, the following problem in the related art is solved. The network-side device is required to start triggering the terminal to send the signal from the PO, which results in unnecessary location delay brought to the terminal in the connected state, and up to now, there is yet no good solution to a specific manner of determining a position of a terminal for the terminal in the connected state.

Optionally, the second DCI may be further used to indicate at least one of:

signal information corresponding to the signal; or whether the terminal, after sending the signal, is required to monitor response information returned by the network-side device. The signal information includes at least one of: a CL, a frequency-domain position, a time-domain position, the number of transmissions performed according to the CL, an interval between two adjacent transmissions, sequence information or power information.

Optionally, the terminal device identifier may be a C-RNTI.

In an optional example, the signal includes a preamble.

Fourth Embodiment

Figure 4:
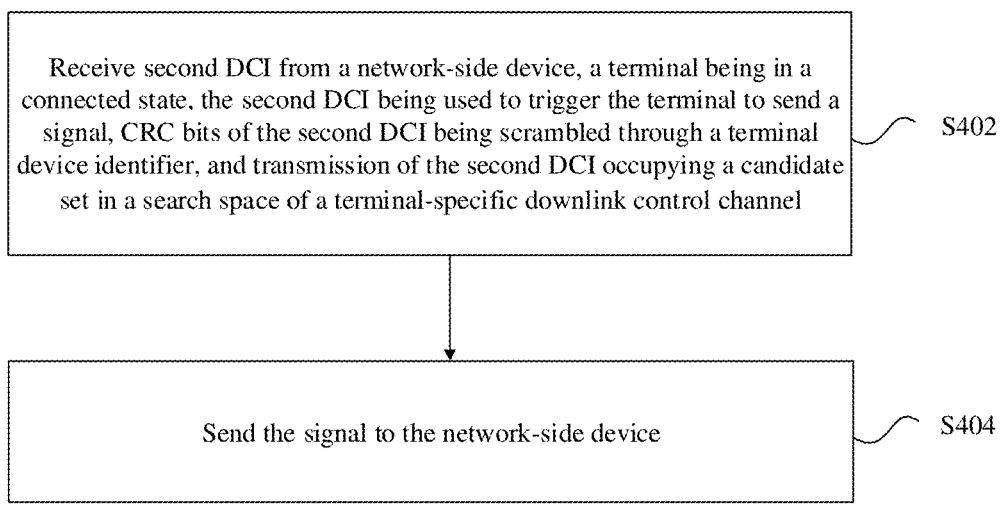
FIG. 4 is a fourth flowchart of a method for determining a position of a terminal according to an embodiment of the disclosure.

The embodiment of the disclosure provides a method for determining a position of a terminal. FIG. 4 is a fourth flowchart of a method for determining a position of a terminal according to an embodiment of the disclosure. As illustrated in FIG. 4, the method includes the following operations.

In S402, second DCI from a network-side device is received, a terminal being in a connected state, the second DCI being used to trigger the terminal to send a signal, CRC bits of the second DCI being scrambled through a terminal device identifier, and transmission of the second DCI occupying a candidate set in a search space of a terminal-specific downlink control channel.

In S404, the signal is sent to the network-side device.

Through the operations, the second DCI from the network-side device is received, the terminal being in the connected state, the second DCI being used to trigger the terminal to send the signal, the CRC bits of the second DCI being scrambled through the terminal device identifier and the terminal device identifier being a C-RNTI, and the signal is further sent to the network-side device. Accordingly, the following problem in the related art is solved. The network-side device is required to start triggering the terminal to send the signal from the PO, which results in unnecessary positioning delay brought to the terminal in the connected state, and up to now, there is yet no good solution to a specific manner of determining a position of a terminal for the terminal in the connected state.

Optionally, the second DCI may be further used to indicate at least one of: signal information corresponding to the signal; or whether the terminal, after sending the signal, is required to monitor response information returned by the network-side device. The signal information includes at least one of: a CL, a frequency-domain position, a time-domain position, the number of transmissions performed according to the CL, an interval between two adjacent transmissions, sequence information or power information.

Optionally, the terminal, after sending the signal, may not always monitor a response message returned by the network-side device by default.

Optionally, the terminal device identifier may be a C-RNTI.

Optionally, the signal may include a preamble.

General explanations and descriptions will be made to the above technical solutions below in combination with an example but are not intended to limit the embodiments of the disclosure.

A network-side device (called a network hereinafter) triggers signal transmission of a terminal through first DCI or a paging message and determines a position of the terminal according to a signal from the terminal. Correspondingly, the terminal determines that the network triggers the signal transmission of the terminal by receiving the first DCI or the paging message and sends the signal. Transmission of the first DCI is started from a PO of the terminal device.

It is to be noted that, on the basis of an existing positioning technology, for example, by measuring a transmission timing advance and a direction of arrival of the signal from the terminal, the network can estimate the position of the terminal. The signal from the terminal is a determined signal. When the network receives the signal from the terminal, the network can determine that the signal is from the terminal triggered by the network.

By such a method, it is ensured that the network can determine the position of the terminal based on the signal without switching the terminal in an idle state into a connected state, so that unnecessary power loss of the terminal device can be avoided and power saving of the terminal device can be facilitated.

Herein, CRC bits of the first DCI are scrambled through one of: a P-RNTI, a terminal device identifier or low bits of the terminal device identifier. When the low bits of the terminal device identifier are used to scramble the CRC bits of the first DCI, the network also indicates high bits of the terminal device identifier through the first DCI, correspondingly, the terminal also determines the high bits of the terminal device identifier according to the first DCI. When the P-RNTI is used to scramble the CRC bits of the first DCI, the network further indicates the terminal device identifier through the first DCI, correspondingly, the terminal further determines the terminal device identifier according to the first DCI.

Herein, when the network triggers signal transmission of the terminal through the first DCI, at least one of the following operations is further included. The network indicates through the first DCI that the network triggers signal transmission of the terminal, correspondingly, the terminal determines according to the first DCI that the network triggers signal transmission of the terminal. The network indicates signal information of the terminal through the first DCI, correspondingly, the terminal determines the signal information of the terminal according to the first DCI. The terminal device, after sending the signal, does not monitor a response message by default. Or, through the first DCI, the network indicates whether the terminal, after sending the signal, is required to monitor the response message from the network, correspondingly, according to the first DCI, the terminal device determines whether the terminal device, after sending the signal, is required to monitor the response message.

It is to be noted that, "indicating through the first DCI that the network triggers signal transmission of the terminal" represents that it is indicated through a field in the first DCI that the present DCI is used to trigger transmission of a positioning signal of the terminal rather than other purposes. Correspondingly, "determining through the first DCI that the network triggers signal transmission of the terminal" represents that it is determined through a field in the first DCI that the present DCI is used to trigger the transmission of the positioning signal of the terminal rather than other purposes. The method is applied to the case that the first DCI has other uses in addition to triggering the transmission of the positioning signal of the terminal.

Since the signal transmission is only used to position the terminal by the network, after the terminal sends the signal, the network is not required to reply the terminal with any response message and the terminal is also not required to monitor the response message from the network. Considering the above reason, the terminal, after sending the signal, does not monitor the response message by default, which is relatively simple and no additional control overhead may be brought. However, it is indicated through the first DCI whether the terminal, after sending the signal, is required to monitor the response message from the network, which is relatively high in flexibility. For example, it is assumed that the signal is a preamble, and when the network indicates through the first DCI that the terminal, after sending the preamble, is required to monitor a random access response (RAR) message from the network, positioning of the terminal by the network and random access of the terminal can be implemented at the same time.

Herein, when the network triggers signal transmission of the terminal through the paging message, at least one of the following operations is included. The network indicates through the paging message that the network triggers signal transmission of the terminal, correspondingly, the terminal determines according to the paging message that the network triggers transmission of signal information of the terminal. The network indicates the terminal device identifier through the paging message, correspondingly, the terminal determines the terminal device identifier according to the paging message. The network indicates the terminal device identifier and the signal information of the terminal through the paging message, correspondingly, the terminal determines the terminal device identifier and the signal information of the terminal according to the paging message. The terminal device, after sending the signal, does not monitor the response message from the network by default. Or, the network indicates through the paging message whether the terminal device, after sending the signal, is required to monitor the response message from the network, correspondingly, according to the paging message, the terminal device determines whether the terminal device, after sending the signal, is required to monitor the response message.

It is to be noted that "indicating through the paging message that the network triggers signal transmission of the terminal" represents that it is indicated through a field in the paging message that the present paging message is used to trigger positioning signal transmission of the terminal rather than for ordinary paging. Correspondingly, "determining through the paging message that the network triggers signal transmission of the terminal" represents that it is determined through a field in the paging message that the present paging message is used to trigger transmission of a positioning signal of the terminal rather than for ordinary paging.

Since the signal transmission is only used to position the terminal by the network, after the terminal sends the signal, the network is not required to reply the terminal with any response message and the terminal is also not required to monitor the response message from the network. Considering the above reason, the terminal, after sending the signal, does not monitor the response message by default, which is relatively simple and no additional control overhead may be brought. However, it is indicated through the paging message whether the terminal, after sending the signal, is required to monitor the response message from the network, which is relatively high in flexibility. For example, it is assumed that the signal is the preamble, when the network indicates through the paging message that the terminal, after sending the preamble, is required to monitor the RAR message from the network, positioning of the terminal by the network and random access of the terminal can be implemented at the same time.

Herein, the operation that the signal is sent includes that the signal is sent according to the signal information.

When the network is required to confirm the position of the terminal and the terminal is in the connected state, the network may further trigger signal transmission of the terminal through second DCI, correspondingly, the terminal determines that the network triggers the signal transmission of the terminal by receiving the second DCI.

Herein, transmission of the second DCI occupies a candidate set in a search space of a terminal-specific downlink control channel, CRC bits of the second DCI are scrambled through the terminal device identifier, and the terminal device identifier is a C-RNTI. A frequency of occurrence of a candidate set in the search space of the terminal-specific downlink control channel (NPDCCH) far exceeds a frequency of occurrence of a terminal-specific PO.

By using the method, the network can timely trigger signal transmission of the terminal in the connected state and thus is not required to wait for a next PO of the terminal to trigger signal transmission of the terminal through the first DCI or the paging message, thereby a positioning delay of the terminal device in the connected state is finally reduced.

Herein, when the network triggers signal transmission of the terminal through the second DCI, at least one of the following operations is also included. The network indicates through the second DCI that the network triggers signal transmission of the terminal, correspondingly, the terminal determines according to the second DCI that the network triggers signal transmission of the terminal. The network indicates the signal information of the terminal through the second DCI, correspondingly, the terminal determines the signal information of the terminal device according to the second DCI. The terminal device, after sending the signal, does not monitor the response message from the network by default. Or, the network indicates whether the terminal, after sending the signal, is required to monitor the response message through the second DCI, correspondingly, the terminal device determines whether the terminal device, after sending the signal, is required to monitor the response message according to the second DCI.

It is to be noted that "indicating through the second DCI that the network triggers signal transmission of the terminal" represents that it is indicated through a field in the second DCI that the present DCI is used to trigger positioning signal transmission of the terminal rather than other purposes, correspondingly, "determining through the second DCI that the network triggers signal transmission of the terminal" represents that it is determined through a field in the second DCI that the present DCI is used to trigger positioning signal transmission of the terminal rather than other purposes. The method is applied to the case that the second DCI is also used for other purposes, except for triggering positioning signal transmission of the terminal.

Since the signal transmission is only used to position the terminal by the network, after the terminal sends the signal, the network is not required to reply the terminal with any response message and the terminal is also not required to monitor the response message from the network. Considering the above reason, the terminal, after sending the signal, does not monitor the response message by default, which is relatively simple and no additional control overhead may be brought. However, it is indicated through the second DCI whether the terminal, after sending the signal, is required to monitor the response message from the network, which is relatively high in flexibility. For example, it is assumed that the signal is the preamble, and when the network indicates through the second DCI that the terminal, after sending the preamble, is required to monitor the RAR message from the network, positioning of the terminal by the network and random access of the terminal can be implemented at the same time.

Herein, the signal information includes at least one of: a CL, a frequency-domain position, a time-domain position, the number of transmissions performed according to the CL, an interval between two adjacent transmissions, sequence information or power information. The CL is used to determine a repeat count of a signal basic unit corresponding to one transmission of the signal. Signal-based positioning is applied to different CLs (normal coverage, extended coverage and extreme coverage) and different CLs correspond to different repeat counts of the signal basic unit. The frequency-domain position is used to determine a subcarrier for transmitting the signal. When frequency hopping transmission is adopted for the signal, the frequency-domain position is a position of a subcarrier used to transmit a first signal basic unit during one transmission of the signal. When frequency hopping transmission is not adopted for the signal, the frequency-domain position is a position of a subcarrier fixedly used to transmit all signal basic units of the signal. The number of the above subcarrier is not limited to one. The time-domain position is used to determine a start moment of transmission of the signal. The start moment of transmission of the signal refers to a start of a signal transmission opportunity in a specified CL. The signal transmission opportunity in the specified CL is used for one transmission of the signal at the specified CL and is configured through cell-specific signaling. The number of transmissions performed according to the CL refers to the number of transmissions performed according to the specified CL according to present signal transmission. The interval between two adjacent transmissions refers to an interval between start moments of two adjacent signal transmissions. The number of transmissions performed according to the CL is configured, and signal transmission kept for a relatively long time may be supported, so that positioning accuracy is ensured and improved. The sequence information (for example, a sequence index) is used to determine a sequence adopted for a signal basic unit. The power information (for example, target received power of the signal) is used to determine a transmitted power of the signal.

When the signal transmission of the terminal is triggered through the first DCI, a transmission opportunity available for the transmission of the signal (i.e., an available transmission opportunity of the signal) satisfies the following conditions: the available transmission opportunity is after the first DCI and a time difference between a start moment of the available transmission opportunity and an ending moment of the first DCI exceeds a predetermined value. The method is favorable for reserving enough processing time for the terminal to decode the first DCI and prepare to send the signal. Similarly, when signal transmission of the terminal is triggered through the paging message, the transmission opportunity available for transmission of the signal satisfies the following conditions: the available transmission opportunity is after the paging message and a time difference between the start moment of the available transmission opportunity and an ending moment of the paging message exceeds the predetermined value. The method is favorable for reserving enough processing time for the terminal to decode the paging message and prepare to send the signal.

The signal is a preamble.

Alternatively, the above preamble is a single-tone preamble. In such case, no matter whether the terminal has a multi-tone transmission capability, the terminal device can always be positioned by use of a preamble in a single-tone format. By such a method, it is avoided to define positioning signals in different formats for terminals with different capabilities, so that design of the positioning signal is simplified.

When the signal is the preamble, a transmission opportunity for transmission of the preamble is the same as a transmission opportunity for transmission of a random access preamble, or the network configures the transmission opportunity for transmission of the preamble through signaling, correspondingly, the terminal device determines, according to the signaling, the transmission opportunity for transmission of the preamble. Herein, a parameter configured through the signaling and used to determine the transmission opportunity for transmission of the preamble includes at least one of: a period, a time-domain offset, a frequency-domain subcarrier offset or a subcarrier number. Specifically, the period and the time-domain offset are used to determine a start moment of the transmission opportunity for transmission of the preamble (for example, a start of a specified subframe or radio frame), and the frequency-domain subcarrier offset and the subcarrier number are used to determine a subcarrier region occupied by the transmission opportunity for transmission of the preamble.

It is to be noted that transmission durations of preambles at different CLs or repeat counts of a preamble basic unit are different. "the transmission opportunity for transmission of the preamble is the same as the transmission opportunity for transmission of the random access preamble" represents that a transmission opportunity for transmission of a preamble at a specified CL is the same as a transmission opportunity for transmission of a random access preamble at the specified CL. When "the transmission opportunity for transmission of the preamble is configured through the signaling", transmission opportunities for transmissions of preambles at different CLs are independently configured. That is, a transmission opportunity for transmission of a preamble at one specified CL and a transmission opportunity for transmission of a preamble at another specified CL are configured through different parameters (for example, periods, time-domain offsets, frequency-domain subcarrier offsets and subcarrier numbers) respectively.

Through the above technical solution, it is ensured that the network can determine the position of the terminal based on the signal without switching the terminal in an idle state into a connected state, so that unnecessary power loss of the terminal can be avoided and power saving of the terminal device can be facilitated.

From the above descriptions of the implementations, those skilled in the art may clearly know that the method according to the abovementioned embodiments may be implemented by software and a necessary universal hardware platform, and of course, may also be implemented by hardware. However, the former is a preferred implementation in many circumstances. Based on such understanding, a part of the technical solution of the disclosure, which is essential or makes a contribution to the related art, may be embodied in form of software product. The computer software product is stored in a storage medium, including several instructions to cause a computer device (which may be a personal computer, a server, a network device or the like) to execute the method of each embodiment of the disclosure.

Fifth Embodiment

The embodiment further provides a device for determining a position of a terminal, which is applied to a network-side device and configured to implement the abovementioned embodiments and preferred implementations. What has been described will not be described. As used below, the term "module" may implement a combination of software and/or hardware of a predetermined function. Although the device described in the following embodiment is preferably implemented by software, implementation by hardware or a combination of the software and the hardware is also possible and conceivable.

Figure 5:
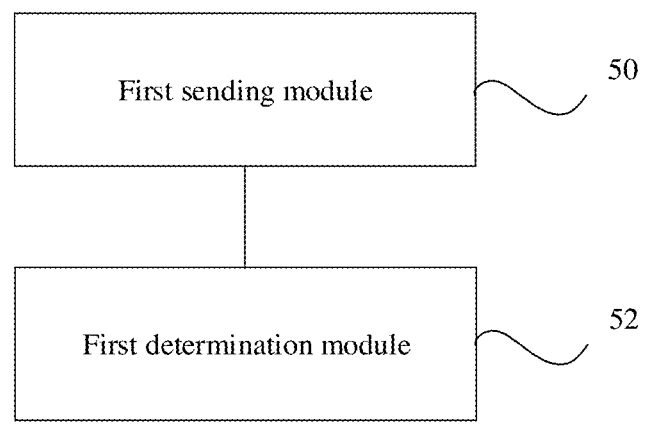
FIG. 5 is a first structure block diagram of a device for determining a position of a terminal according to an embodiment of the disclosure.

FIG. 5 is a first structure block diagram of a device for determining a position of a terminal according to an embodiment of the disclosure. As illustrated in FIG. 5, the device includes a first sending module 50 and a first determination module 52.

The first sending module 50 is configured to send a paging message or first DCI to a terminal, the first DCI or the paging message being used to trigger the terminal to send a signal, and transmission of the first DCI being started from a PO of the terminal.

The first determination module 52 is configured to determine position information of the terminal according to the signal from the terminal.

Through combined actions of the above modules, the first DCI or paging message capable of triggering the terminal to send the signal is sent to the terminal, transmission of the first DCI being started from the PO of the terminal, and a position of the terminal is further determined according to the signal from the terminal. Accordingly, the problem in the related art that the position of the terminal is determined only depending on an NB-IoT uplink signal from the terminal device in a connected state is solved, the position of the terminal can be conveniently confirmed, unnecessary power loss is avoided and power saving of the terminal device is facilitated.

In the embodiment of the disclosure, CRC bits of the first DCI are scrambled through one of: a P-RNTI, a terminal device identifier or low bits of the terminal device identifier. When the CRC bits of the first DCI are scrambled through the low bits of the terminal device identifier, high bits of the terminal device identifier are indicated through the first DCI. When the CRC bits of the first DCI are scrambled through the P-RNTI, the terminal device identifier is indicated through the first DCI.

Optionally, the first DCI may be further used to indicate at least one of: signal information corresponding to the signal; or whether the terminal, after sending the signal, is required to monitor response information returned by a network-side device. The paging message is further used to indicate at least one of: the signal information corresponding to the signal; the terminal device identifier; the terminal device identifier and the signal information; or whether the terminal, after sending the signal, is required to monitor the response information returned by the network-side device.

Herein, the signal information includes at least one of: a CL, a frequency-domain position, a time-domain position, the number of transmissions performed according to the CL, an interval between two adjacent transmissions, sequence information or power information.

In a practical application, the above signal may be a preamble. There are no limits made thereto in the embodiment of the disclosure.

Optionally, when the signal is the preamble, a transmission opportunity for transmission of the preamble may be the same as a transmission opportunity for transmission of a random access preamble, or the transmission opportunity for transmission of the preamble may be indicated through specified signaling.

Optionally, the specified signaling may be used to indicate at least one of the following parameters: a period, a time-domain offset, a repeat count, a frequency-domain subcarrier offset or a subcarrier number.

Optionally, an available transmission opportunity for the signal may satisfy the following conditions: the available transmission opportunity is after the first DCI or the paging message; and a time difference between a start moment of the available transmission opportunity and an ending moment of the first DCI or the paging message exceeds a predetermined value.

Sixth Embodiment

The embodiment further provides a device for determining a position of a terminal, which is applied to the terminal and configured to implement the abovementioned embodiments and preferred implementations. What has been described will not be described. As used below, the term "module" may implement a combination of software and/or hardware of a predetermined function. Although the device described in the following embodiment is preferably implemented by software, implementation by hardware or a combination of the software and the hardware is also possible and conceivable.

Figure 6:
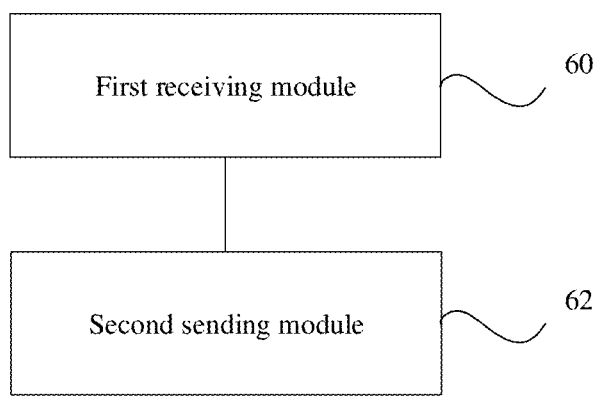
FIG. 6 is a second structure block diagram of a device for determining a position of a terminal according to an embodiment of the disclosure.

FIG. 6 is a second structure block diagram of a device for determining a position of a terminal according to an embodiment of the disclosure. As illustrated in FIG. 6, the device includes a first receiving module 60 and a second sending module 62.

The first receiving module 60 is configured to receive a paging message or first DCI from a network-side device, the first DCI or the paging message being used to trigger the terminal to send a signal, and transmission of the first DCI being started from a PO of the terminal.

The second sending module 62 is configured to send the signal to the network-side device. Through combined actions of the above modules, the first DCI or paging message capable of triggering the terminal to send the signal is received from the network-side device, transmission of the first DCI being started from the PO of the terminal, and the signal is further sent to the network-side device. By using the above technical solution, the problem in the related art that the position of the terminal is determined only depending on an NB-IoT uplink signal from the terminal device in a connected state can be solved, the position of the terminal can be conveniently confirmed, unnecessary power loss can be avoided and power saving of the terminal device can be facilitated.

In the embodiment of the disclosure, CRC bits of the first DCI are scrambled through one of: a P-RNTI, a terminal device identifier or low bits of the terminal device identifier.

Optionally, when the CRC bits of the first DCI are scrambled through the low bits of the terminal device identifier, high bits of the terminal device identifier may be determined through the first DCI; and when the CRC bits of the first DCI are scrambled through the P-RNTI, the terminal device identifier may be determined through the first DCI.

Optionally, the first DCI may be further used to determine at least one of: signal information corresponding to the signal; or whether response information returned by a network-side device is required to be monitored after the signal is sent. The paging message is further used to determine at least one of: the signal information corresponding to the signal; the terminal device identifier; the terminal device identifier and the signal information; or whether the response information returned by the network-side device is required to be monitored after the signal is sent.

Optionally, a response message returned by the network-side device may not be always monitored by default after the signal is sent.

Optionally, the signal information may include at least one of: a CL, a frequency-domain position, a time-domain position, the number of transmissions performed according to the CL, an interval between two adjacent transmissions, sequence information or power information.

Optionally, the terminal may send the signal to the network-side device according to the signal information.

Optionally, the signal may include a preamble.

When the signal is the preamble, a transmission opportunity for transmission of the preamble is the same as a transmission opportunity for transmission of a random access preamble, or the transmission opportunity for transmission of the preamble is determined according to specified signaling. The specified signaling is used to indicate at least one of the following parameters: a period, a time-domain offset, a repeat count, a frequency-domain subcarrier offset or a subcarrier number.

Seventh Embodiment

The embodiment further provides a device for determining a position of a terminal, which is applied to a network-side device and configured to implement the abovementioned embodiments and preferred implementations. What has been described will not be described. As used below, the term "module" may implement a combination of software and/or hardware of a predetermined function. Although the device described in the following embodiment is preferably implemented by software, implementation by hardware or a combination of the software and the hardware is also possible and conceivable.

Figure 7:
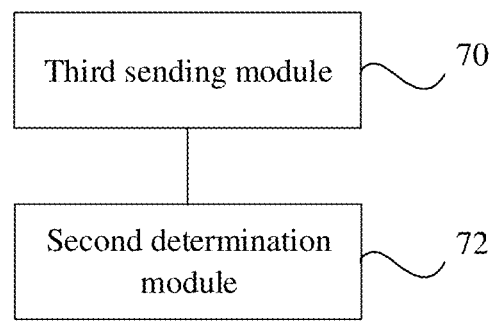
FIG. 7 is a third structure block diagram of a device for determining a position of a terminal according to an embodiment of the disclosure.

FIG. 7 is a third structure block diagram of a device for determining a position of a terminal according to an embodiment of the disclosure. As illustrated in FIG. 7, the device includes a third sending module 70 and a second determination module 72.

The third sending module 70 is configured to send second DCI used to trigger a terminal to send a signal to the terminal, the terminal being in a connected state, CRC bits of the second DCI being scrambled through a terminal device identifier, and transmission of the second DCI occupying a candidate set in a search space of a terminal-specific downlink control channel.

The second determination module 72 is configured to determine position information of the terminal according to the signal from the terminal.

Through combined actions of the above modules, the second DCI used to trigger the terminal to send the signal is sent to the terminal, the terminal being in the connected state and the CRC bits of the second DCI being scrambled through the terminal device identifier, and a position of the terminal is further determined according to the signal from the terminal. Accordingly, the following problem in the related art is solved. The network-side device is required to start triggering the terminal to send the signal from the PO, which results in unnecessary positioning delay brought to the terminal in the connected state, and up to now, there is yet no good solution to a specific manner of determining a position of a terminal for the terminal in the connected state.

Optionally, the second DCI may be further used to indicate at least one of: signal information corresponding to the signal; and the terminal, after sending the signal, does not monitor response information returned by the network-side device or whether the terminal, after sending the signal, is required to monitor the response information returned by the network-side device. The signal information includes at least one of: a CL, a frequency-domain position, a time-domain position, the number of transmissions performed according to the CL, an interval between two adjacent transmissions, sequence information or power information.

Optionally, the terminal device identifier may be a C-RNTI.

In an optional example, the signal includes a preamble.

Eighth Embodiment

The embodiment further provides a device for determining a position of a terminal, which is applied to the terminal and configured to implement the abovementioned embodiments and preferred implementations. What has been described will not be described. As used below, the term "module" may implement a combination of software and/or hardware of a predetermined function. Although the device described in the following embodiment is preferably implemented by software, implementation by hardware or a combination of the software and the hardware is also possible and conceivable.

Figure 8:
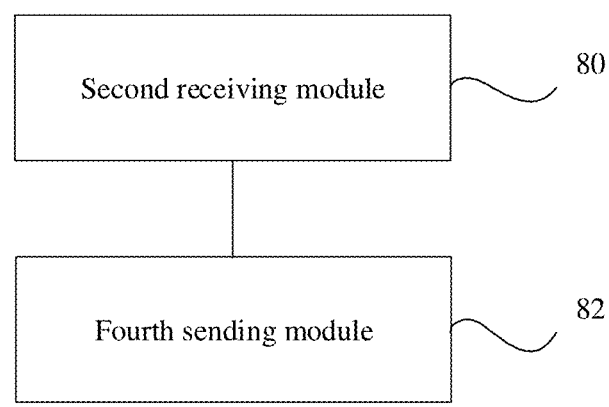
FIG. 8 is a fourth structure block diagram of a device for determining a position of a terminal according to an embodiment of the disclosure.

FIG. 8 is a fourth structure block diagram of a device for determining a position of a terminal according to an embodiment of the disclosure. As illustrated in FIG. 8, the device includes a second receiving module 80 and a fourth sending module 82.

The second receiving module 80 is configured to receive second DCI from a network-side device, the terminal being in a connected state, the second DCI being used to trigger the terminal to send a signal, CRC bits of the second DCI being scrambled through a terminal device identifier, and transmission of the second DCI occupying a candidate set in a search space of a terminal-specific downlink control channel.

The fourth sending module 82 is configured to send the signal to the network-side device.

Through combined actions of the above modules, the second DCI from the network-side device is received, the terminal being in the connected state, the second DCI being used to trigger the terminal to send the signal, and the CRC bits of the second DCI being scrambled through the terminal device identifier. Accordingly, the following problem in the related art is solved. The network-side device is required to start triggering the terminal to send the signal from the PO, which results in unnecessary positioning delay brought to the terminal in the connected state, and up to now, there is yet no good solution to a specific manner of determining a position of a terminal for the terminal in the connected state.

In the embodiment of the disclosure, the second DCI is further used to indicate at least one of: signal information corresponding to the signal; and a response message from the network-side device is not monitored after the signal is sent or whether the terminal, after sending the signal, is required to monitor response information returned by the network-side device.

Optionally, the signal information may include at least one of: a CL, a frequency-domain position, a time-domain position, the number of transmissions performed according to the CL, an interval between two adjacent transmissions, sequence information or power information.

Optionally, the signal may include a preamble.

It is to be noted that each of the abovementioned modules may be implemented by software or hardware and the latter may be implemented in, but not limited to, the following manner. All of the above modules are located in the same processor or the modules are freely located in different processors respectively.

On the basis of the above analysis, the method embodiments provided in the first to fourth embodiments of the disclosure may be executed in a mobile terminal, a computer terminal, a network-side device or a similar operation device. For example, in case of running in a computer terminal, the computer terminal may include one or more processors (the processor may include, but be not limited to, a processing device such as a micro control unit (MCU) or a field-programmable gate array (FPGA)), a memory configured to store data and a transmission module configured for a communication function. Those skilled in the art may know that the structure described above is only schematic and not intended to limit the structure of the above electronic device. For example, the computer terminal may further include components more or fewer than the described components or have a configuration different from the above-described configuration.

The memory may be configured to store a software program of an application software and modules embodied in the above fifth to eighth embodiments (for example, the first sending module 50 and/or first determination module 52 in the fifth embodiment). For example, in the fifth embodiment, the processor runs the software program stored in the memory and the first sending module 50 and/or the first determination module 52, thereby implementing the above process of determining a position of a terminal. The memory may include a high-speed random access memory (RAM) and may also include a nonvolatile memory, for example, one or more magnetic storage devices, flash memories or other nonvolatile solid-state memories. In some embodiments, the memory may further include a memory arranged remotely relative to the processor and the remote memory may be connected to a computer terminal through a network. An example of the above network includes, but is not limited to, the Internet, an intranet, a local area network, a mobile communication network and a combination thereof. It is to be noted that, in some circumstances, the modules embodied in the fifth to eighth embodiments of the disclosure may further be applied to the processor. There are no limits made thereto in the embodiment of the disclosure.

For better understanding the above technical solutions, the technical solutions will be described below in combination with some preferred embodiments. When necessary, the following preferred embodiments may be combined for use. There are no limits made thereto in the embodiments of the disclosure.

First Preferred Embodiment

Figure 9:
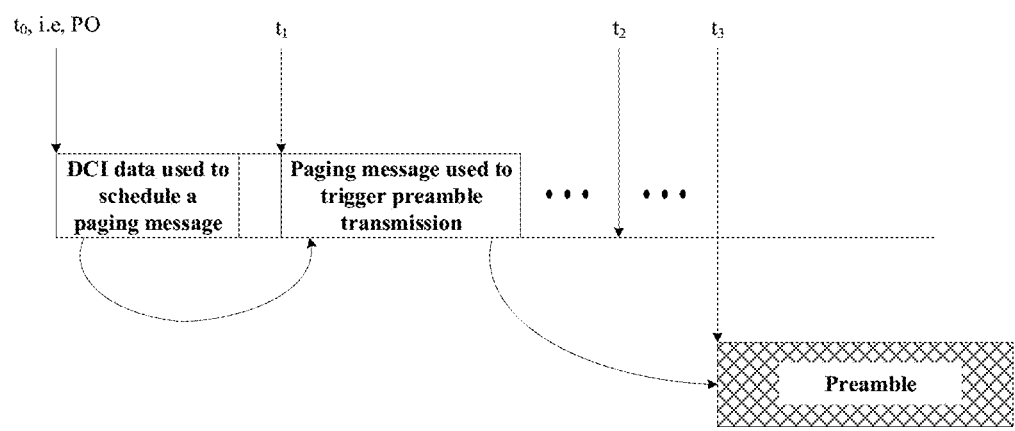
FIG. 9 is a schematic diagram of triggering preamble transmission of a terminal in an idle state according to a first preferred embodiment of the disclosure.

FIG. 9 is a schematic diagram of triggering preamble transmission of a terminal in an idle state according to the first preferred embodiment of the disclosure. As illustrated in FIG. 9, it is assumed that a terminal is in an idle state and a network is required to confirm a position of the terminal.

The network starts sending DCI data (also called paging DCI) including scheduling information of a paging message (configured to page the terminal) from a moment $t_0$, the moment $t_0$ being a start moment of a PO subframe of the terminal.

The network starts sending the paging message for paging the terminal device from a moment $t_1$ according to the scheduling information, the paging message indicating that the network triggers preamble transmission of the terminal and providing related preamble transmission information.

The terminal starts receiving the DCI data including the scheduling information of the paging message for paging the terminal device from the moment $t_0$.

Herein, the moment $t_0$ is the start moment of the PO subframe of the terminal.

The terminal starts receiving the paging message for paging the terminal from the moment $t_1$ according to the scheduling information.

The terminal parses the paging message, determines, according to the paging message, that the network triggers preamble transmission of the terminal device, and acquires the related preamble transmission information.

The terminal device starts sending a preamble from a moment $t_3$ according to the preamble information.

The terminal device, after sending the preamble, directly enters a sleep state (namely not monitoring an RAR message from the network).

Second Preferred Embodiment

Figure 10:
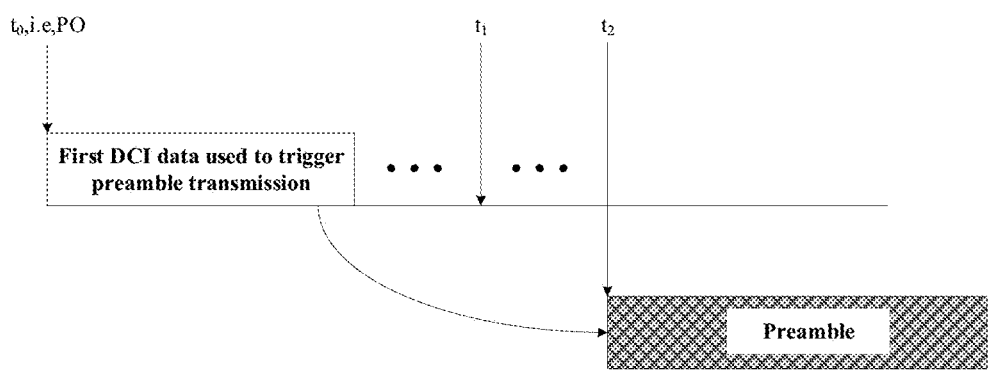
FIG. 10 is a schematic diagram of triggering preamble transmission of a terminal in an idle state according to a second preferred embodiment of the disclosure.

FIG. 10 is a schematic diagram of triggering preamble transmission of a terminal in an idle state according to the second preferred embodiment of the disclosure. As illustrated in FIG. 10, it is assumed that a terminal is in an idle state and a network is required to confirm a position of the terminal.

The network starts sending first DCI from a moment $t_0$.

The moment $t_0$ is a start moment of a PO subframe of the terminal.

Herein, CRC bits of the first DCI are scrambled through a P-RNTI. The first DCI indicates that the network triggers preamble transmission of the terminal and provides related preamble transmission information.

The terminal starts receiving the first DCI from the moment $t_0$.

The moment $t_0$ is the start moment of the PO subframe of the terminal.

Herein, the CRC bits of the first DCI are scrambled through the P-RNTI.

The terminal parses the first DCI, determines, according to the first DCI, that the network triggers preamble transmission of the terminal device, and acquires the related preamble transmission information.

The terminal device starts sending a preamble from a moment $t_2$ according to the preamble information.

The terminal, after sending the preamble, directly enters a sleep state (namely not monitoring an RAR message from the network).

Third Preferred Embodiment

Figure 11:
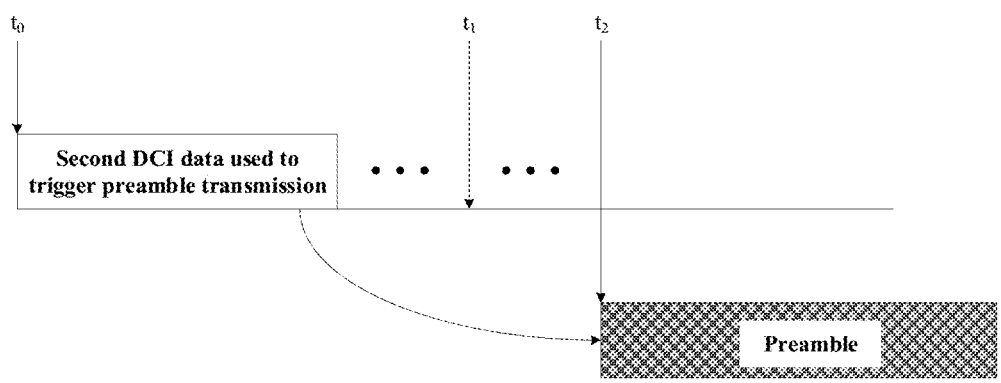
FIG. 11 is a schematic diagram of triggering preamble transmission of a terminal in a connected state according to a third preferred embodiment of the disclosure.

FIG. 11 is a schematic diagram of triggering preamble transmission of a terminal in a connected state according to the third preferred embodiment of the disclosure. As illustrated in FIG. 11, it is assumed that a terminal is in a connected state and a network is required to confirm a position of the terminal.

The network starts sending second DCI from a moment $t_0$.

The moment $t_0$ is a start moment of a candidate set in a search space of a terminal-specific NPDCCH.

Herein, CRC bits of the second DCI are scrambled through a C-RNTI allocated to the terminal. The second DCI indicates that the network triggers preamble transmission of the terminal device and provides related preamble transmission information.

The terminal starts receiving the second DCI from the moment $t_0$.

The moment $t_0$ is the start moment of the candidate set in a search space of the terminal-specific downlink control channel. The CRC bits of the second DCI are scrambled through the C-RNTI allocated to the terminal.

The terminal parses the second DCI, determines according to the second DCI that the network triggers preamble transmission of the terminal device, and acquires the related preamble transmission information.

The terminal device starts sending a preamble from a moment $t_2$ according to the preamble information.

The terminal, after sending the preamble, directly enters a sleep state (namely not monitoring an RAR message from the network).

Fourth Preferred Embodiment

For triggering of preamble transmission of a terminal, a behavior of the terminal after sending a preamble is determined in one of the following two manners.

In a first manner, the terminal does not always monitor an RAR message from a network by default.

For example, as shown in the first embodiment, the terminal directly enters a sleep state. As shown in the second embodiment, the terminal directly enters the sleep state when no other data is required to be sent and received.

In a second manner, the network indicates whether the terminal, after sending the preamble, is required to monitor the RAR message from the network through a field in a paging message (corresponding to a scene in the first embodiment), first DCI (corresponding to a scene in the second embodiment) or second DCI (corresponding to a scene in the third embodiment). The terminal determines whether the terminal, after sending the preamble, is required to monitor the RAR message from the network according to the field in the paging message (corresponding to the scene in the first embodiment), the first DCI (corresponding to the scene in the second embodiment) or the second DCI (corresponding to the scene in the third embodiment). For example, the above field includes a flag bit, and two states represented by the bit correspond to not monitoring and monitoring the RAR message respectively.

Fifth Preferred Embodiment

Figure 12:
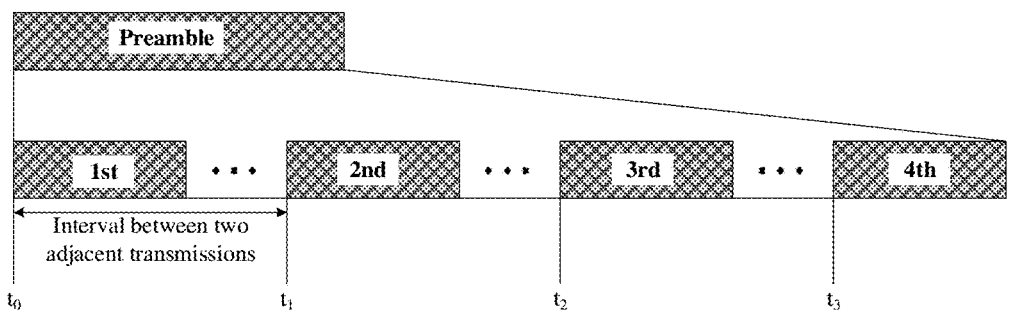
FIG. 12 is a schematic diagram of a preamble transmission manner according to a preferred embodiment of the disclosure.

FIG. 12 is a schematic diagram of a preamble transmission manner according to a preferred embodiment of the disclosure.

Preamble information born in a paging message and first or second DCI includes at least one of: a CL, a frequency-domain position, a time-domain position, the number of transmissions performed according to the determined CL, an interval between two adjacent transmissions, sequence information or power information.

Herein, the CL is used to determine a repeat count of a preamble basic unit corresponding to one preamble transmission. The basic unit includes four symbol groups, each symbol group includes one cyclic prefix (CP) and five symbols and a duration is about 1.2 to 1.6 milliseconds (ms). The repeat count of the basic unit is power of 2, for example, 16, 32, 64, 128 or 256. It is to be noted that, when the preamble information born in the paging message and the first or second DCI does not include the parameter "CL", the CL is predefined. For example, it is predefined that one preamble transmission always corresponds to 128 or more than 128 preamble basic units.

Herein, the frequency-domain position is used to determine a subcarrier for transmitting a preamble. When frequency hopping transmission is adopted for the preamble, the frequency-domain position is a position of a subcarrier for transmitting a first preamble basic unit in a frequency hopping region (i.e., a subcarrier region occupied by a transmission opportunity available for transmission of the preamble). A frequency hopping granularity of the preamble is the preamble basic unit (i.e., four symbol groups) and subcarriers occupied by different preamble basic units are located in a range of the above frequency hopping region. In the range of the above frequency hopping region, the subcarriers occupied by preamble basic units except the first preamble basic unit are determined according to at least one of the following parameters: the subcarriers occupied by the previous preamble basic units, an index of the present preamble basic units and a physical cell identifier (PCI). When frequency hopping transmission is not adopted, the frequency-domain position is a position of a subcarrier fixedly used to transmit all the basic units of the preamble. It is to be noted that, when different subcarriers in the frequency hopping region are allowed to be occupied by the four symbol groups in each preamble basic unit, the subcarrier for transmitting the preamble basic unit is equivalent to a subcarrier for transmitting a first symbol group of the preamble basic unit.

Herein, the time-domain position is used to determine a start moment of transmission of the preamble. The start moment is a start of a preamble transmission opportunity dedicated to a corresponding CL. The preamble transmission opportunity dedicated to the CL is configured through cell-specific signaling (for example, a system message). For example, as illustrated in FIG. 1, it is assumed that moments $t_2$ and $t_3$ are start moments of two continuous available preamble transmission opportunities after the paging message. Specifically, in the embodiment, the parameter "time-domain position" is used to indicate that the preamble is presently transmitted in a range of the second available preamble transmission opportunity after the paging message, that is, the present preamble transmission is started from the moment $t_3$. When the preamble information born in the paging message and the first or second DCI does not include the parameter "time-domain position", preamble transmission should be started from a predefined moment and may specifically be started from the first available preamble transmission opportunity after the paging message and the first or second DCI. For example, as illustrated in FIG. 1, it is assumed that the moments $t_2$ and $t_3$ are the start moments of the two preamble transmission opportunities after the paging message. Specifically, in the embodiment, it is assumed that a time difference between an ending moment of the paging message and the moment $t_2$ does not exceed a predetermined threshold value. In such case, the preamble transmission opportunity started from the moment $t_2$ is considered as an unavailable preamble transmission opportunity and the first available preamble transmission opportunity after the paging message is started from the moment $t_3$.

Herein, the number of transmissions performed according to the CL refers to the number of present preamble transmissions performed according to an indicated CL and is equivalent to the number of occupied preamble transmission opportunities dedicated to the CL. The interval between two adjacent transmissions refers to an interval between start moments of two adjacent preamble transmissions and is equivalent to an interval between two occupied adjacent preamble transmission opportunities dedicated to the CL. For example, as illustrated in FIG. 4, it is assumed that the terminal repeatedly transmits the preamble for four times according to the determined CL. Specifically, in the embodiment, first transmission is started from the moment $t_1$ (equivalent to occupation of the preamble transmission opportunity started from the moment $t_0$), second transmission is started from the moment $t_1$ (equivalent to occupation of the preamble transmission opportunity started from the moment $t_1$), third transmission is started from the moment $t_2$ (equivalent to the occupation of the preamble transmission opportunity started from the moment $t_2$) and fourth transmission is started from the moment $t_3$ (equivalent to occupation of the preamble transmission opportunity started from the moment $t_3$). The interval between the start moments of two adjacent preamble transmissions (equivalent to the interval between two occupied adjacent preamble transmission opportunities) is equal to $t_1-t_0$ ($t_1-t_0$ is equal to $t_2-t_1$ and equal to $t_3-t_2$). Depending on a magnitude of the interval, in a range from the start moment $t_0$ to the ending moment $t_1$, there is no other preamble transmission opportunity except the transmission opportunity started from the moment $t_0$ and configured for preamble transmission, or, there is at least one preamble transmission opportunity not used for present preamble transmission; and the same to a range from the start moment $t_1$ to the ending moment $t_2$ and a range from the start moment $t_2$ to the ending moment $t_3$.

It is to be noted that, when the preamble information born in the paging message and the first or second DCI does not include the parameter "interval between two adjacent transmissions", the interval between two adjacent transmissions is predefined. For example, it is predefined that the interval between two adjacent transmissions is a duration between start moments of two adjacent preamble transmission opportunities (equivalent to that continuous available preamble transmission opportunities are always be occupied by preamble transmission). When the above preamble information born in the paging message and the first or second DCI does not include the parameters "number of transmissions performed according to the CL" and "interval between two adjacent transmissions", both of the number of transmissions performed according to the CL and the interval between two adjacent transmissions are predefined. For example, it is predefined that the number of transmissions is always one, or, it is predefined that the number of transmissions is always K (integer greater than 1) and it is predefined that the interval between two adjacent transmissions is the duration between the start moments of the two adjacent available preamble transmission opportunities (equivalent to that continuous available preamble transmission opportunities are always occupied by present transmission).

Herein, the sequence information is used to determine a sequence adopted for a preamble basic unit. As described in the embodiment, considering that each preamble basic unit includes four symbol groups, in such case, a length of a corresponding sequence is 4 and the sequence may specifically be one in Table 1.

TABLE 1

| Index | Sequence |
|---|---|
| 0 | [+1 +1 +1 +1] |
| 1 | [+1 −1 +1 −1] |
| 2 | [+1 +1 −1 −1] |
| 3 | [+1 −1 −1 +1] |
| 4 | [+j +j +j +j] |
| 5 | [+j −j +j −j] |
| 6 | [+j +j −j −j] |
| 7 | [+j −j −j +j] |

Herein, four sequence values in the sequence sequentially correspond to the four symbol groups in the preamble basic unit, that is, the same symbol value is adopted for all symbols (5 symbols) in each symbol group. For example, when the above preamble information born in the paging message and the first DCI or the second DCI does not include the parameter "sequence information", the sequence information is predefined. For example, it is predefined that the sequence is an all-1 sequence (corresponding to a sequence index 0 in Table 1).

Herein, the power information is used to determine a transmitted power of the preamble, such as target received power of the preamble. Specifically, the transmitted power of the preamble may be determined according to the target received power of the preamble and the following equation:

$$P_t = \min\{P_{t,max}, P_{r,target} + PL\},$$

where $P_t$ represents the transmitted power of the preamble, $P_{t\_max}$ represents a maximum transmitted power allowed by the terminal device, $P_{r\_target}$ represents the indicated target received power of the preamble and PL represents downlink path loss, estimated by the terminal device, between a serving base station and the terminal device.

Herein, units of $P_t$, $P_{t\_max}$ and $P_{r\_target}$ are dBm and a unit of PL is dB.

When the above preamble information born in the paging message and the first or second DCI does not include the parameter "power information", the terminal device always sends the signal according to the allowed maximum transmitted power.

From the above, the problem in the related art that the position of the terminal is determined only depending on an NB-IoT uplink signal from the terminal device in the connected state is solved, the position of the terminal can be conveniently confirmed in the idle state, unnecessary power loss of the terminal can be avoided and power saving of the terminal device can be facilitated.

An embodiment of the disclosure further provides a storage medium. Optionally, in the embodiment, the above storage medium may be configured to store a program code configured to execute the following operations.

In S1, a paging message or first DCI is sent to a terminal, the first DCI or the paging message being used to trigger the terminal to send a signal, and transmission of the first DCI being started from a PO of the terminal.

In S2, a position of the terminal is determined according to the signal from the terminal.

An embodiment of the disclosure further provides a storage medium. Optionally, in the embodiment, the storage medium may be configured to store a program code configured to execute the following operations.

In S1, a paging message or first DCI from a network-side device is received, the first DCI or the paging message being used to trigger a terminal to send a signal, and transmission of the first DCI being started from a PO of the terminal.

In S2, the signal is sent to the network-side device.

An embodiment of the disclosure also provides a storage medium. Optionally, in the embodiment, the storage medium may be configured to store a program code configured to execute the following operations.

In S1, second DCI used to trigger a terminal to send a signal is sent to the terminal, the terminal being in a connected state, CRC bits of the second DCI being scrambled through a terminal device identifier, and transmission of the second DCI occupying a candidate set in a search space of a terminal-specific downlink control channel.

In S2, position information of the terminal is determined according to the signal from the terminal.

An embodiment of the disclosure also provides a storage medium. Optionally, in the embodiment, the storage medium may be configured to store a program code configured to execute the following operations.

In S1, second DCI from a network-side device is received, a terminal being in a connected state, the second DCI being used to trigger the terminal to send a signal, CRC bits of the second DCI being scrambled through a terminal device identifier, and transmission of the second DCI occupying a candidate set in a search space of a terminal-specific downlink control channel.

In S2, the signal is sent to the network-side device.

Optionally, in the embodiment, the above storage medium may include, but not limited to various media capable of storing program codes such as a U disk, a read-only memory (ROM), a RAM, a mobile hard disk, a magnetic disk or an optical disk.

Optionally, specific examples in the embodiment may refer to the examples described in the abovementioned embodiments and optional implementations and will not be described in the embodiment.

Apparently, those skilled in the art should know that each module or each operation of the disclosure may be implemented by a universal computing device, and the modules or operations may be concentrated on a single computing device or distributed on a network formed by multiple computing devices, and may optionally be implemented by program codes executable by the computing devices, so that the modules or operations may be stored in a storage device for execution with the computing devices, the illustrated or described operations may be executed in sequences different from those described here in some circumstances, or may form each integrated circuit module respectively, or multiple modules or operations therein may form a single integrated circuit module for implementation. As a consequence, the disclosure is not limited to any specific hardware and software combination.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

The technical solutions provided in the embodiments of the disclosure may be applied to a process of determining a position of a terminal. The first DCI or paging message capable of triggering the terminal to send the signal is sent to the terminal, transmission of the first DCI being started from the PO of the terminal, and the position of the terminal is further determined according to the signal from the terminal. Accordingly, the problem in the related art that the position of the terminal may be determined only depending on an uplink signal from the terminal device in the connected state is solved, the position of the terminal can be conveniently confirmed, unnecessary power loss can be avoided and power saving of the terminal device is facilitated.

The invention claimed is:

1. A method for determining a position of a terminal, comprising:
sending a paging message or first downlink control information (DCI) to the terminal, the first DCI or the paging message being used to trigger the terminal to send a signal, and transmission of the first DCI being started from a paging opportunity (PO) of the terminal; and determining a position of the terminal according to the signal from the terminal, wherein the signal comprises a preamble;

wherein when the signal is the preamble, a transmission opportunity for transmission of the preamble is the same as a transmission opportunity for transmission of a random access preamble, or the transmission opportunity for transmission of the preamble is indicated through specified signaling, wherein the specified signaling is used to indicate at least one of the following parameters: a period, a time-domain offset, a frequency-domain subcarrier offset or a subcarrier number, the parameters being used to determine the transmission opportunity for transmission of the preamble.

2. The method of claim 1, wherein cyclic redundancy check (CRC) bits of the first DCI are scrambled through one of: a paging-radio network temporal identifier (P-RNTI), a terminal device identifier or low bits of the terminal device identifier.

3. The method of claim 2, wherein when the CRC bits of the first DCI are scrambled through the low bits of the terminal device identifier, high bits of the terminal device identifier are indicated through the first DCI; and when the CRC bits of the first DCI are scrambled through the P-RNTI, the terminal device identifier is indicated through the first DCI.

4. The method of claim 1, wherein the first DCI is further used to indicate at least one of: signal information corresponding to the signal; or whether the terminal, after sending the signal, is required to monitor response information returned by a network-side device, wherein the signal information comprises at least one of: a coverage level (CL), a frequency-domain position, a time-domain position, a number of transmissions performed according to the CL, an interval between two adjacent transmissions, sequence information or power information.

5. The method of claim 1, wherein the paging message is further used to indicate at least one of:

the terminal device identifier; the terminal device identifier and signal information corresponding to the signal; or whether the terminal, after sending the signal, is required to monitor response information returned by a network-side device, wherein the signal information comprises at least one of: a CL, a frequency-domain position, a time-domain position, a number of transmissions performed according to the CL, an interval between two adjacent transmissions, sequence information or power information.

6. The method of claim 1, wherein an available transmission opportunity for the signal satisfies the following conditions: the available transmission opportunity is after the first DCI or the paging message; and a time difference between a start moment of the available transmission opportunity and an ending moment of the first DCI or the paging message exceeds a predetermined value.

7. A method for determining a position of a terminal, comprising:

sending second downlink control information (DCI) used to trigger the terminal to send a signal to the terminal, the terminal being in a connected state, cyclic redundancy check (CRC) bits of the second DCI being scrambled through a terminal device identifier, and transmission of the second DCI occupying a candidate set in a search space of a terminal-specific downlink control channel; and determining a position of the terminal according to the signal from the terminal, wherein the signal comprises a preamble;

wherein when the signal is the preamble, a transmission opportunity for transmission of the preamble is the same as a transmission opportunity for transmission of a random access preamble, or the transmission opportunity for transmission of the preamble is indicated through specified signaling, wherein the specified signaling is used to indicate at least one of the following parameters: a period, a time-domain offset, a frequency-domain subcarrier offset or a subcarrier number, the parameters being used to determine the transmission opportunity for transmission of the preamble.

8. The method of claim 7, wherein the second DCI is further used to indicate at least one of: signal information corresponding to the signal; or whether the terminal, after sending the signal, is required to monitor response information returned by a network-side device, wherein the signal information comprises at least one of: a coverage level (CL), a frequency-domain position, a time-domain position, a number of transmissions performed according to the CL, an interval between two adjacent transmissions, sequence information or power information.

9. The method of claim 7, wherein the terminal device identifier comprises a cell-radio network temporary identifier (C-RNTI).

10. A method for determining a position of a terminal, comprising:

receiving, by the terminal, a paging message or first downlink control information (DCI) from a network-side device, the first DCI or the paging message being used to trigger the terminal to send a signal, and transmission of the first DCI being started from a paging opportunity (PO) for the terminal; and sending, by the terminal, the signal to the network-side device, wherein the signal comprises a preamble;

wherein when the signal is the preamble, a transmission opportunity for transmission of the preamble is the same as a transmission opportunity for transmission of a random access preamble, or the transmission opportunity for transmission of the preamble is indicated through specified signaling, wherein the specified signaling is used to indicate at least one of the following parameters: a period, a time-domain offset, a frequency-domain subcarrier offset or a subcarrier number, the parameters being used to determine the transmission opportunity for transmission of the preamble.

11. The method of claim 10, further comprising:

scrambling cyclic redundancy check (CRC) bits of the first DCI through one of: a paging-radio network temporal identifier (P-RNTI), a terminal device identifier or low bits of the terminal device identifier.

12. The method of claim 10, wherein
the first DCI is further used to determine at least one of: signal information corresponding to the signal; or whether response information returned by the network-side device is required to be monitored after the signal is sent, wherein
the signal information comprises at least one of: a coverage level (CL), a frequency-domain position, a time-domain position, a number of transmissions performed according to the CL, an interval between two adjacent transmissions, sequence information or power information.

13. The method of claim 10, wherein the paging message is further used to determine at least one of:
the terminal device identifier; the terminal device identifier and signal information corresponding to the signal; or whether response information returned by the network-side device is required to be monitored after the signal is sent, wherein
the signal information comprises at least one of: a CL, a frequency-domain position, a time-domain position, a number of transmissions performed according to the CL, an interval between two adjacent transmissions, sequence information or power information.

14. The method of claim 10, wherein response information returned by the network-side device is not monitored after the signal is sent.

15. The method of claim 10, wherein
an available transmission opportunity for the signal satisfies the following conditions: the available transmission opportunity is after the first DCI or the paging message; and a time difference between a start moment of the available transmission opportunity and an ending moment of the first DCI or the paging message exceeds a predetermined value.

16. A method for determining a position of a terminal, comprising:
receiving, by the terminal, second downlink control information (DCI) from a network-side device, the terminal being in a connected state, the second DCI being used to trigger the terminal to send a signal, cyclic redundancy check (CRC) bits of the second DCI being scrambled through a terminal device identifier, and transmission of the second DCI occupying a candidate set in a search space of a terminal-specific downlink control channel; and
sending, by the terminal, the signal to the network-side device,
wherein the signal comprises a preamble;
wherein
when the signal is the preamble, a transmission opportunity for transmission of the preamble is the same as a transmission opportunity for transmission of a random access preamble, or the transmission opportunity for transmission of the preamble is indicated through specified signaling, wherein
the specified signaling is used to indicate at least one of the following parameters: a period, a time-domain offset, a frequency-domain subcarrier offset or a subcarrier number, the parameters being used to determine the transmission opportunity for transmission of the preamble.

* * * * *